United States Patent [19]

Bellofatto

[11] Patent Number: 4,608,022
[45] Date of Patent: Aug. 26, 1986

[54] AIR AND SEA NAVIGATIONAL INSTRUMENT SIMULATION AND INSTRUCTIONAL AID

[75] Inventor: Richard C. Bellofatto, 19 Springdale Ave., Saugus, Mass. 01906

[73] Assignee: Richard C. Bellofatto, Saugus, Mass.

[21] Appl. No.: 613,294

[22] Filed: May 23, 1984

[51] Int. Cl.⁴ .............................................. G09B 9/02
[52] U.S. Cl. .................................................. 434/243
[58] Field of Search ................. 434/49, 239, 243, 244

[56] References Cited

U.S. PATENT DOCUMENTS

| | | | |
|---|---|---|---|
| 2,396,141 | 3/1946 | Adorjan et al. | 434/239 |
| 2,404,386 | 7/1946 | Levine et al. | 434/243 |
| 4,173,080 | 11/1979 | Minnicks, III | 434/243 |
| 4,226,028 | 10/1980 | Robson | 434/243 |

*Primary Examiner*—William H. Grieb

[57] ABSTRACT

A hand-held movable airplane or boat model is equipped on an outer face with gravity actuated simulations of actual navigational instruments. Two interchangeable compass rose discs are mounted each on a separate split shaft spindle protruding from the model. One disc is asymmetrically weighted to maintain the disc in one orientation while the model, held in a vertical plane, moves and rotates to simulate routes of travel. When used with an indicator on the front center of the model, the weighted disc simulates an azimuth directional gyro. One of the spindles is bored axially to admit an indicator shaft rotatably therethrough. An indicator arrow mounted orthogonally on the outer end of the shaft aligns with an orthogonal extension on the inner end of the shaft below the model. A transparent line extends from the shaft extension through a magnetic movable simulated Non Directional Beacon (NDB) or Radio Beacon (RB) to an edge mounted pulley which maintains a weighted end of the line away from the vertical surface over which the model and NDB/RB are moved. A non-weighted compass rose held stationary by a heading control knob simulates a fixed card Automatic Direction Finder (ADF) or Radio Direction Finder (RDF). The knob, secured within a slot in the model and held against the rose by a tensioned elastic band around the base of the bored spindle, may be turned to rotate the compass rose thereby simulating a rotatable card ADF/RDF. Moving the knob away from the rose in an L-shaped slot and placing the weighted disc on the bored spindle simulates a Radio Magnetic Indicator (RMI). A second indicator may be rotatably mounted in a small bore in the outer end of the first indicator shaft. A second weighted line from the pointer of the second indicator to an elevated edge mounted NDB/RB with the first indicator and weighted disc simulates a double-barred RMI.

18 Claims, 7 Drawing Figures

AIR AND SEA NAVIGATIONAL INSTRUMENT SIMULATION AND INSTRUCTIONAL AID

CROSS-REFERENCE TO RELATED APPLICATION

This is a continuation-in-part application of co-pending application Ser. No. 06/533,801 filed 9/20/83 for a Flight Instrument Simulation and Instructional Aid by the applicant.

BACKGROUND OF THE INVENTION

The present invention relates to simulators for airplane panel instruments and maritime navigational equipment used as ground training aids and in particular to actual instrument simulators actuated by gravitational means used with a fully movable hand-held model of the airplane or boat.

BACKGROUND ART

Learning the complexities of flying and boating instruments and their uses in navigating is greatly facilitated by simulators of the instruments viewed in conjunction with the orientation and motion of a model airplane or boat to understand exactly what the readings on the actual instruments mean relative to the action of the actual airplane or boat.

None of the prior art devices provide a means for total unrestricted motion of the airplane or boat model over the surface used to indicate the flight pattern or seagoing route and still provide a true simulation of the actual instruments as they would be viewed by a pilot in the actual airplane or boat.

None of the prior art devices maintain an entirely unrestricted surface over which the direction of motion are demonstrated.

Most of the prior art devices are very complex with gears, electrical apparatus or structural components.

None of the other training aids provide flexibility in changing components of the simulated instruments to demonstrate a variety of different actual instruments.

DISCLOSURE OF INVENTION

By providing a virtual simulation of the actual flight or sailing instruments in appearance, action and including all components in proper relative orientation, in combination with a hand-held model of the aircraft or boat which may be moved freely in any direction or orientation over the field of all potential routes of travel, a much better understanding can be learned of the complex interaction between the actual instruments and the true significance of their readings relative to the action of the aircraft or boat.

Providing visually transparent lines, and diverting the weighted ends of the lines to a point off of the surface area used to illustrate the routes of travel produces an unrestricted surface with no distractions from the instruments and model action thereby producing a better simulation and enhancing the learning process.

Simplicity of operation and thereby reduced expenses in fabricating and operating the present invention is afforded by simple mechanisms automatically activated by the force of gravity in the form of an eccentrically weighted disc rotatably mounted on a spindle to simulate the action of a compass, maintaining North uppermost on the compass in a vertical direction as North is always on top of a map and in the form of an off-the-field weighted nearly invisible line to maintain the orientation of the indicators toward the signal transmitters or beacons.

Interchangeability of simulated instrument components in the form of different compass roses and multiple indicators permit the demonstration of a number of different navigational instruments with a single training aid and simulator.

BRIEF DESCRIPTION OF THE DRAWINGS

These and other details and advantages of my invention will be described in connection with the accompanying drawings, which are furnished only by way of illustration and not in limitation of the invention, and in which drawings.

BEST MODE FOR CARRYING OUT THE INVENTION

Figure 1:
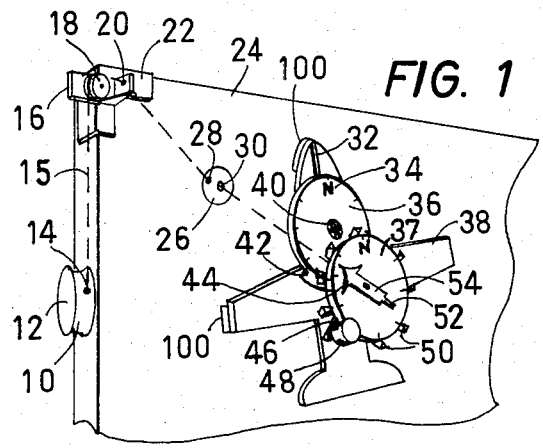
FIG. 1 is a perspective view of the preferred embodiment of the invention having an airplane model magnetically mounted on a vertical surface shown in part.
Figure 2:
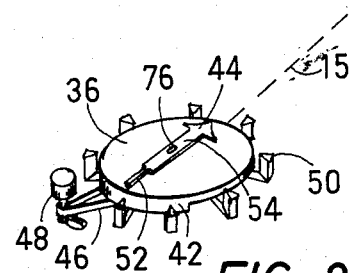
FIG. 2 is a partial perspective view of the invention showing a transfer of the gravity actuated rose to the spindle with the gravity actuated indicator.

In FIG. 1 the preferred embodiment of the invention comprises a rigid thin model 38 in the outline plan shape of an airplane, in this case, formed of stiff inexpensive material such as plastic, wood or thick cardboard. A boat model 110 may also be used alternately, as in FIG. 7. The hand-held model 38 or 110 is moved over or secured upon a magnetically attractive vertical surface 24 by magnets 100 secured to the underside of the model at the extremities. By lifting the model away from the vertical surface it may be moved by hand to simulate actual travel. Movement and rotation of the model over the entire surface of the unobstructed vertical surface enables the illustration of any type of flight patterns or seagoing routes. Other securing means such as tape could be utilized for vertical surfaces which are not magnetically attractive.

Figure 3:
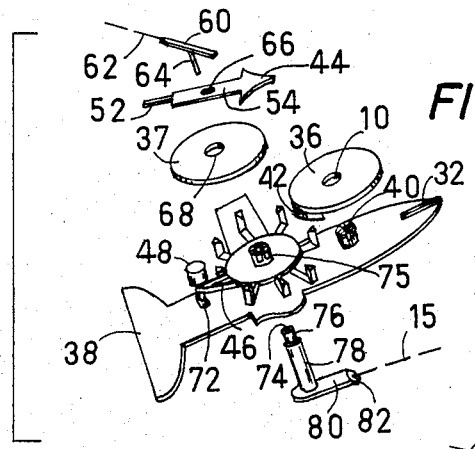
FIG. 3 is a cutaway perspective view of the model airplane with all of the instrument simulation attachments aligned for attachment to the model.

Rotationally mounted on the outside surface of the model on slotted spindles 40 and 75, best seen in FIG. 3, are two compass roses 36 and 37, each marked on the outside face near the perimeter with spaced radial lines and numbers indicating the 360° of arc around the rose with an "N" for North or the 0° or 360° location. The roses have equal outside diameters and equal internal central opening diameters, and both are mounted on equal diameter spindles; therefore, the two roses are interchangeable between the two spindles.

A first compass rose 36, while in tone to differentiate it from the other rose, differs in that on the underside of the rose a weight 42 is positioned eccentrically on one edge of the rose and permanently secured thereto. The eccentric weight which may be molded as part of the body of the rose, causes the rose to maintain the same orientation relative to the vertical surface regardless of the movement or orientation of the model. With the center of gravity of the weight 42 located exactly opposite the North reading 34 on the rose it will always maintain North up and thereby serve as a simulated magnetic compass when the same standard applies to the vertical surface as in most maps, designating the up direction as North. An indicator 32, a raised line painted a different color from the model, located along the central axis of the model adjacent to the first rose 36 indicates the heading of the model airplane on the rose and can be read directly therefrom as in an actual azimuth directional gyro on the instrument panel of a plane.

The second compass rose 37, dark in tone, is of uniform thickness and of even weight distribution and therefore is not self-orienting. When the second compass rose 37 is mounted on the second spindle 75, the second spindle is further provided with an Automatic Directional Finder (ADF) indicator which reads on the rose face. The same identical instrument is called a Radio Direction Finder (RDF) in sea navigation. A cylindrical bore extends through the central axis of the second spindle and through the body of the model. Through the bore a cylindrical indicator shaft 78 is rotatably secured. At the outside end of the indicator shaft a narrowed oval slitted tip 76 receives a bearing pointer 54 having a centrally located oval opening 66 therethrough which fits over the shaft tip with a tight friction fit so that both the shaft 78 and the pointer 54 rotate together within the bore. At the inner end of the indicator shaft a permanently secured extension 80 protrudes approximately orthogonally from the shaft end in a direction coincident with the primary arrow 44 of the bearing pointer 54. A transparent line 15, such as a nylon fish line, is attached to a hole 82 through the extension 80. The line runs to a simulated Non Directional Beacon (NDB) 26 magnetically or otherwise attached to the vertical surface and easily moved to any location on the vertical surface. In sea navigation the same device is called a Radio Beacon (RB). The line 15 passes through a low-friction passageway with openings 30 and 28 through the simulated NDB/RB 26 and the line runs to the corner of the rectangular vertical surface and passes through another low-friction diverting fixture 22 hooked over the corner of the vertical surface. Basically a corner frame member formed of two channels intersecting at 90°, the diverting member 22 is provided with an outward extension 20 having a hole for the line located away from the vertical surface at approximately the same distance from the surface as the incoming line. Then the line passes over a rotatable pulley 18, basically a circumferentially notched wheel rotatably mounted to the diverting member on an extension of the diverting member past the outer edge of the vertical surface. The diverting member causes the line to hang off of the vertical surface and thereby not impede any movement of the model or beacons on the surface and so that the weight 10 attached to the end of the line may hang down straight and move freely with the motion of the model 38 without having the weight visible on the vertical surface to increase further the effectiveness of the simulation and not interfere with attention to the model or the simulated instruments. As the model is moved around the vertical surface the weight always maintains the line 15 in a taut condition so that the indicator shaft extension 80 to which the line is attached, is always directed toward the NDB/RB and consequently the arrow 44 of the bearing pointer 54 is always oriented toward the NDB/RB 26, thereby simulating an Automatic Direction Finder (ADF) indicator on an actual airplane instrument panel or a Radio Direction Finder (RDF) indicator on an actual ship navigational instrument. The arrow 44 therefore points to the relative bearing of the NDB/RDF as indicated on the second compass rose 37 when the rose is set to the correct heading of the model. At the opposite end of the bearing pointer indicator from the arrow a thin line pointer 52 will indicate the reciprocal relative bearing.

Figure 5:
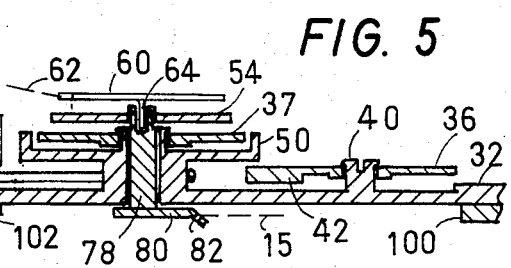
FIG. 5 is a vertical section view of an alternate embodiment of the invention having a model airplane taken through the central axis of the model showing all of the attachments for instrument simulation.
Figure 4:
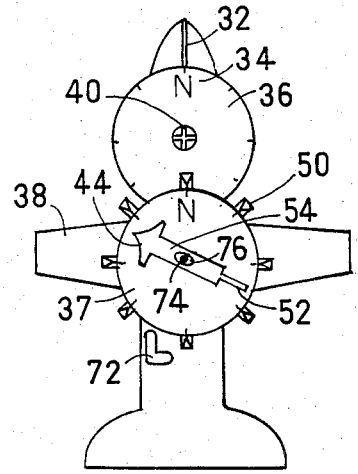
FIG. 4 is a plan view of the preferred emebdiment having a model airplane showing two compass roses mounted thereon.
Figure 7:
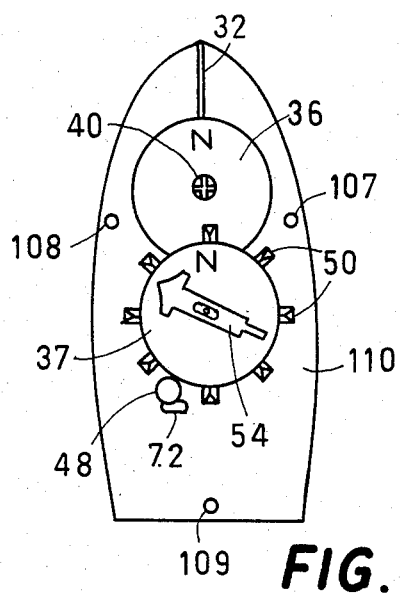
FIG. 7 is a plan view of the preferred embodiment of the invention having a boat model.

Movably mounted in an L-shaped slot 72 through the model body, in FIGS. 3, 4 and 7, a heading set knob 48 narrow shaft portion extends through the body of the model in the slot and is secured therein by an enlargement of the knob shaft on the underside 102 in FIG. 5. An elastic band 46 around the base of the heading set knob further encircles a raised base portion of the model surface, under the second spindle to elevate the second rose above the first. The tensioned elastic band serves to hold the knob tightly against the second rose in the portion of the slot adjacent to the second rose and prevent motion of the second rose, thereby simulating a fixed card ADF/RDF. In the adjacent position, the knob 48 may be used to adjust the second rose 37 by turning the knob to turn the rose, simulating a rotational card ADF/RDF.

When the first compass rose 36 is substituted for the second rose 37 on the spindle and the heading set knob is held away from the rose by the tension of the elastic band with the knob in the portion of the L-shaped slot away from the rose, the gravitationally oriented first rose then acts with the arrow pointer 44 of the indicator 54 as a Radio Magnetic Indicator (RMI) giving the magnetic bearing from the reading of the arrow pointer on the compass.

Extending outward laterally and vertically away from the elevated base under the second spindle are spider index markers 50, triangular in cross-section. The ends of the index markers are positioned immediately adjacent to the perimeter of the compass rose on the second spindle and spaced around the perimeter at intervals of 45° to serve as simulated index markers just as in the actual instrument dial.

Figure 6:
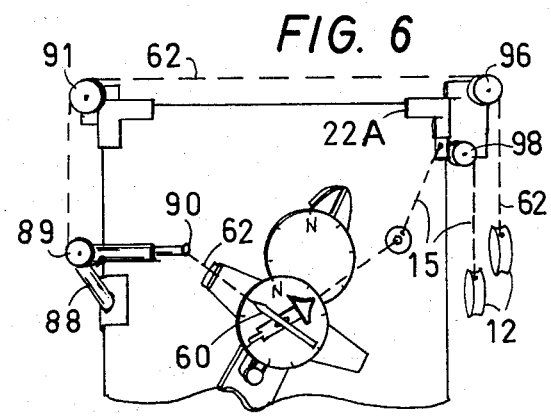
FIG. 6 is a partial perspective view of an alternate embodiment of the invention having a model airplane with a second gravity actuated indicator added.

In FIGS. 3, 5 and 6 an alternate embodiment of the invention provides an additional indicator 60 positioned above the first indicator 54 rotatably mounted by insertion of a thin cylindrical shaft 64 from the second indicator 60 inserted into a small cylindrical bore 74 in the outer tip 76 of the indicator shaft 78. From the pointed end of the second indicator, a second transparent line 62, secured to the pointed end, extends to an elevated second simulated Non Directional Beacon (NDB) 90 or Radio Beacon (RB) in the form of a telescoping tube extensible over a vast area of the vertical surface from an edge mount 88. The tube is mounted away from the vertical surface a sufficient distance to permit the model and all the simulated instruments to pass comfortably between the tube and the vertical surface. Because both lines 15 and 62 are always held taut by a weight at the end of each, and one is well above the other, the two lines never cross each other or become entangled. The second line 62, depending upon which edge of the vertical surface it is mounted, extends through one or more pulleys 89 and 91 to an upper corner pulley 96 from which the second line extends downward pulled by the weight 12 attached to the end of the second line maintaining the line taut so that the second indicator is always oriented toward the second NDB/RB 90. Both weights 12 are formed with an indented section 10, seen in FIG. 1, to enable the line to be wrapped around the weight for storage. With two indicators a double-barred RMI instrument is then simulated which determines a fixed bearing from the NDB's/RB's.

In FIG. 7 the preferred embodiment of the invention is shown with a boat model 110 rather than an airplane model. Markings around the perimeter of the model indicate a red port light 108, a green starboard light 107 and a white stern light 109. The two compass roses 36 and 37 are identical to those of the airplane model. In this case the upper rose 36 simulates an actual azimuth directional gyro on a ship and the lower compass rose 37 simulates a ship's Radio Direction Finder (RDF), which is identical to the Automatic Direction Finder on an airplane.

In use, the model with simulated instrument dials can be moved by hand, after lifting to overcome the magnetic attraction force, over the surface or to any location on the vertical surface freely and oriented in any direction realtive to a compass direction and relative to one or more NDB's/RB's and demonstrate clearly the effect of various motions and orientations of the model on the various instruments. Such vivid and active demonstrations provide an excellent training basis for the flight student and sailing student to understand exactly what each instrument would do on the instrument panel of an actual plane or boat under similar flight or sailing conditions of the real plane or boat.

It is understood that the preceding description is given merely by way of illustration and not in limitation of the invention and that various modifications may be made thereto without departing from the spirit of the invention as claimed.

I claim:

1. A classroom training aid for air and sea navigational instrument simulation and instruction comprising:
   a hand-held model simulating an air or sea vessel movable by hand and mountable primarily by a magnetic means on a vertical surface, over the entire area of which vertical surface the model may be moved and secured in any direction and orientation to simulate actual routes of travel of the vessel;
   at least one simulated navigational instrument mounted on the model appearing and acting correspondingly to the appearance and action of the actual navigational instrument on an air or sea vessel, which instrument comprises a compass rose oriented to indicate the position of the model and the indicator means found in the actual instrument wherein the model rotates around the compass rose as in the actual vessel;
   an automatic gravitational means for controlling the simulated instrument of the model, which gravitational means in no way interferes with the movement and orientation of the model over the vertical surface;
   wherein the automatic gravitational means for controlling the simulated instrument function of the model is a simulated Automatic Direction Finder (ADF) or Radio Direction Finder (RDF) comprising a spindle protruding from an outer surface of the model, rotatably mounted on the spindle a compass rose disc; an opening through the central axis of the spindle and through the body of the model, through which opening an indicator shaft is rotatably secured; at an outer end of which indicator shaft a pointer means is secured to rotate with the shaft; at an inner end of which indicator shaft a rigid orthogonal extension of the shaft protrudes in the direction of the pointer; and attached to the shaft extension a transparent line leading to a simulated Non Directional Beacon (NDB) or Radio Beacon (RB) secured to the vertical surface by a magnetic means, wherein the NDB/RB has a low-friction means of looping the line through the NDB/RB; an edge-mounted low-friction looping means of diverting the line from the NDB/RB to an edge of the vertical surface; and a weight secured to the end of the line which maintains the line in a taut condition so that the pointer always points to the NDB/RB regardless of the orientation and position of the model, and the weight is held clear of the vertical surface by the diverting means.

2. The invention of claim 1 wherein the vertical surface is rectangular with right-angle corners and the low-friction looping means of diverting the line comprises an orthogonal corner frame member with a pulley member rotatably attached thereto, wherein the frame member is placed over the corner of the vertical surface and the line is threaded over the pulley so that the weight on the end of the line holds the frame member in place.

3. The invention of claim 1 wherein the pointer means comprises a shaft having two opposing ends, a primary pointer end with an arrow indicator always pointing in the direction of the NDB and a secondary pointer end having a thin shaft extension so that when the arrow end reading on the compass rose is the relative bearing, the line end reading is the reciprocal bearing.

4. The invention of claim 1 further comprising a heading set knob comprising a shaft movably mounted to the model body in an L-shaped slot through the body adjacent to the compass rose, and a tensional elastic band looped around the knob and around the spindle so that the knob may be maintained away from the compass rose by locating the knob in a leg of the L-shaped slot away from the compass rose or the knob may be maintained against the compass rose by locating the knob in a leg of the L-shaped slot adjacent to the compass rose, wherein the heading set knob may be rotated to turn the compass rose to indicate the appropriate heading, thereby providing a manually rotatable card ADF/RDF.

5. The invention of claim 1 further comprising a series of triangular section pins protruding from the outer surface of the model airplane in a circular configuration surrounding the compass rose at 45° intervals simulating the instrument indices.

6. A classroom training aid for air and sea navigational instrument simulation and instruction comprising:
   a hand-held model simulating an air or sea vessel movable by hand and mountable primarily by a magnetic means on a vertical surface, over the entire area of which vertical surface the model may be moved and secured in any direction and orientation to simulate actual routes of travel of the vessel;
   at least one simulated navigational instrument mounted on the model appearing and acting correspondingly to the appearance and action of the actual navigational instrument on an air or sea vessel, which instrument comprises a compass rose oriented to indicate the position of the model and the indicator means found in the actual instrument wherein the model rotates around the compass rose as in the actual vessel;

an automatic gravitational means for controlling the simulated instrument of the model, which gravitational means in no way interferes with the movement and orientation of the model over the vertical surface;

wherein the automatic gravitational means for indicating the heading of the model is a Radio Magnetic Indicator (RMI) comprising a spindle protruding from an outer surface of the model, rotatably mounted on the spindle a compass rose disc in the form of a flat circular disc with compass points indicated on an outer face of the disc and an eccentrically positioned weight mounted on a back surface of the disc to maintain the disc with a North indicator always pointing in one direction relative to the vertical surface regardless of the model orientation in moving and rotating the model to simulate travel over the vertical surface; an opening through the central axis of the spindle and through the body of the model, through which opening an indicator shaft is rotatably secured; at an outer end of which indicator shaft a pointer means is secured to rotate with the shaft; at an inner end of which indicator shaft a rigid orthogonal extension of the shaft protrudes in the direction of the pointer; attached to the shaft extension a transparent line leading to a simulated Non Directional Beacon (NDB) or Radio Beacon (RB) secured to the vertical surface by a magnetic means, which NDB/RB has a low-friction means of looping the line through the NDB/RB; an edge-mounted low-friction looping means of diverting the line away from the NDB/RB to an edge of the vertical surface; and a weight secured to the end of the line which maintains the line in a taut condition so that the pointer always points to the NDB/RB regardless of the orientation and position of the model, and the weight is held clear of the vertical surface by the diverting means.

7. The invention of claim 6 wherein the pointer comprises a shaft having two opposing ends, a primary pointer end with an arrow indicator always pointing in the direction of the NDB/RB, thereby indicating the bearing on the compass disc, and a secondary pointer end having a thin line shaft extension thereby pointing to a reciprocal bearing on the compass disc.

8. The invention of claim 7 further comprising a small cylindrical opening partially into the outer end of the indicator shaft; inserted rotatably into the small opening a small shaft rigidly connected to an orthogonal small needle pointer forming a bearing indicator; extending directly from a pointed end of the needle pointer a second transparent line which loops through a second simulated Non Directional Beacon (NDB) or Radio Beacon (RB) secured to the vertical surface by an edge mounting means, which second NDB/RB is a low-friction looping means located a sufficient distance away from the vertical surface to permit passage of the model therebetween; and a second low-friction looping means located on the diverting means further away from the vertical surface than the low-friction looping means for the first line, thereby simulating RMI instrumentation capable of cross-fixing a bearing between two signal stations, wherein a weight at an end of the second line maintains the second line taut.

9. The invention of claim 8 wherein the vertical surface is rectangular with right-angle corners and the low-friction looping means of diverting the line comprises an orthogonal corner frame member with two pulleys rotatably attached thereto, one mounted a greater distance away from the frame member than the other, wherein the frame member is placed over the corner of the vertical surface and one line is threaded through each pulley so that the weights on the ends of the lines hold the frame member in place and the lines are separated by the distance between the pulleys.

10. The invention of claim 9 wherein each weight is provided with a recesses area in the body of the weight for storing each line which is wrapped around the respective weight for storage.

11. A classroom training aid for air and sea navigational instrument simulation and instruction comprising:

a model simulating an air or sea vessel mounted by magnetic means on a vertical surface, over the entire area of which vertical surface the model may be moved in any direction and orientation to simulate actual routes of travel of the vessel;

two simulated navigational instruments mounted on the model, each of which comprises a rotatable compass rose which are interchangeable one with the other, each being mounted on a similar diameter spindle with a slotted end protruding from an outer surface of the model and each having a similar diameter opening through the center of the rose;

rotatably mounted on a first spindle, a first of which compass roses comprises a flat circular disc with compass points indicated on an outer face of the disc and an eccentrically positioned weight mounted on a back surface of the disc to maintain the disc in the same orientation relative to the vertical surface regardless of the model orientation in moving and rotating the model to simulate routes of travel over the vertical surface, thereby simulating an azimuth directional gyro with an indicator on the model to align with the compass rose heading indications;

a second of which compass roses comprises a flat circular disc with compass points indicated on an outer face of the disc rotationally mounted on a second spindle having a cylindrical bore through the axis of the spindle and through the model, and rotatably secured within the bore protruding out two ends of the bore, a pointer shaft, at an outer end of which shaft is rigidly secured an orthogonal pointer and at an inner end of which shaft is rigidly secured an orthogonal shaft extension in the same direction as the pointer, and attached to the shaft extension a transparent line leading to a simulated signal transmitter secured to the vertical surface by a magnetic means, which simulated transmitter has a low-friction means for looping the line through the transmitter to a low-friction looping means of diverting the line from the transmitter to an edge of the vertical surface, and weight secured to the end of the line to maintain the line in a taut condition so that the pointer always points to the simulated transmitter regardless of the orientation and position of the model airplane, thereby simulating an Automatic Direction Finder or Radio Direction Finder pointing to a Non Directional Beacon or Radio Beacon.

12. The invention of claim 11 wherein the first compass rose replaces the second compass rose on the second spindle thereby simulating a Radio Magnetic Indicator pointing to a Non Directional Beacon or Radio Beacon.

13. The invention of claim 11 further comprising a series of triangular section pins protruding from the outer surface of the model in a circular configuration surrounding the compass rose at 45° intervals simulating the instrument indices.

14. The invention of claim 11 further comprising a heading set knob comprising a shaft movably mounted to the model body in an L-shaped slot through the body adjacent to the compass rose and a tensioned elastic band looped around the knob and around the spindle so that the knob may be maintained away from the compass rose by locating the knob in a leg of L-shaped slot away from the compass rose or the knob may be maintained against the compass rose by locating the knob in a leg of the L-shaped slot adjacent to the compass rose, wherein the heading set knob may be rotated to turn the compass rose to indicate the appropriate heading, thereby providing a manually rotatable card ADF/RDF.

15. The invention of claim 12 wherein the pointer comprises a shaft having two opposing ends, a primary pointer end with an arrow indicator always pointing in the direction of the NDB/RB, thereby indicating the bearing on the compass disc, and a secondary pointer end having a thin line shaft extension thereby pointing to a reciprocal bearing on the compass disc.

16. The invention of claim 15 further comprising a small cylindrical opening partially into the outer end of the indicator shaft; inserted rotatably into the small opening a small shaft rigidly connected to an orthogonal small needle pointer forming a bearing indicator; extending directly from a pointed end of the needle pointer a second transparent line which loops through a second simulated NDB/RB secured to the vertical surface by an edge mounting means, which second NDB/RB is a low-friction looping means located a sufficient distance away from the vertical surface to permit passage of the model therebetween; and a second low-friction looping means located on the diverting means further away from the vertical surface than the low-friction looping means for the first line, thereby simulating RMI instrumentation capable of cross-fixing a bearing between two signal stations, wherein a weight at an end of the second line maintains the second line taut.

17. The invention of claim 16 wherein the vertical surface is rectangular with right-angle corners and the low-friction looping means of diverting the line comprises an orthogonal corner frame member with two pulleys rotatably attached thereto, one mounted a greater distance away from the frame member than the other, wherein the frame member is placed over the corner of the vertical surface and one line is threaded through each pulley so that the weights on the ends of the lines hold the frame member in place and the lines are separated by the distance between the pulleys.

18. The invention of claim 17 wherein each weight is provided with a recessed area in the body of the weight for storing each line which is wrapped around the respective weight for storage.

* * * * *